United States Patent
Bejean et al.

(10) Patent No.: US 7,844,353 B2
(45) Date of Patent: Nov. 30, 2010

(54) METHOD OF COMMUNICATION BY RELAY BETWEEN A PORTABLE REMOTE CONTROL AND HOME AUTOMATION APPLIANCES

(75) Inventors: Alain Bejean, Gruffy (FR); Denis Maugain, Poisy (FR); Eric Lagarde, Sallanches (FR)

(73) Assignee: Somfy SAS, Cluses (FR)

( * ) Notice: Subject to any disclaimer, the term of this patent is extended or adjusted under 35 U.S.C. 154(b) by 226 days.

(21) Appl. No.: 11/655,587

(22) Filed: Jan. 19, 2007

(65) Prior Publication Data
US 2007/0185597 A1 Aug. 9, 2007

(30) Foreign Application Priority Data
Feb. 6, 2006 (FR) .................................. 06 01056

(51) Int. Cl.
*G05B 15/00* (2006.01)
*G05B 19/18* (2006.01)
*H04B 7/00* (2006.01)
(52) U.S. Cl. .......................... 700/83; 700/65; 455/41.2; 455/41.3
(58) Field of Classification Search .................. 700/83, 700/60; 455/41.2, 41.3
See application file for complete search history.

(56) References Cited

U.S. PATENT DOCUMENTS

| 4,301,542 | A  | * | 11/1981 | Weintraub et al. | .......... 455/353 |
| 6,297,746 | B1 |   | 10/2001 | Nakazawa et al. | |
| 6,348,956 | B1 | * | 2/2002  | Tanigawa et al. | ............ 348/734 |
| 2004/0163314 | A1 |   | 8/2004 | Lagarde et al. | |
| 2004/0203387 | A1 | * | 10/2004 | Grannan | ..................... 455/41.2 |
| 2005/0011652 | A1 |   | 1/2005 | Hua | |
| 2005/0162282 | A1 |   | 7/2005 | Dresti et al. | |
| 2005/0272372 | A1 |   | 12/2005 | Rodriguez | |

FOREIGN PATENT DOCUMENTS

| WO | WO 01/95283 A | 12/2001 |
| WO | WO 03/007259 A | 1/2003 |

* cited by examiner

*Primary Examiner*—Albert DeCady
*Assistant Examiner*—Sivalingam Sivanesan
(74) *Attorney, Agent, or Firm*—Frommer Lawrence & Haug LLP; Ronald R. Santucci

(57) ABSTRACT

The method governs the operation of a home automation installation comprising a portable remote control, a relay and home automation appliances, and in which at least some home automation appliances can receive, by wireless channel, control commands sent by the portable remote control. The method is such that control commands can be sent selectively according to a scenario to the home automation appliances over the same communication bearer by the relay when the latter receives a specific command sent by the portable remote control to the relay.

11 Claims, 3 Drawing Sheets

METHOD OF COMMUNICATION BY RELAY BETWEEN A PORTABLE REMOTE CONTROL AND HOME AUTOMATION APPLIANCES

This application claims priority benefits from French Patent Application No. 06 01056 filed Feb. 6, 2006.

The invention relates to a method of operating a home automation installation comprising a portable remote control, a relay and home automation appliances, and in which at least some home automation appliances can receive, by wireless channel, control commands sent by the portable remote control. The invention also relates to a home automation installation operating according to this method.

BACKGROUND OF THE INVENTION

In the field of home automation, it is possible for a user to remotely control, wirelessly, different electrical appliances installed in the openings of a building (for example, motorized roller blinds, motorized garage doors, motorized locks), in particular by means of remote controls transmitting control commands by electromagnetic and, in particular, radiofrequency waves.

In this field, and in related fields associated with the control of Hi-Fi and video appliances, there is a desire to improve the comfort of the user and to simplify the controls. Thus, scenario-type control buttons are available on the remote controls. They are used to apply a predefined scheme to the control not only of the Hi-Fi and video appliances, but also to the lighting level in the room in which the appliances are located. To save these scenarios, various configuration methods are known from the state of the art.

The user has the benefit, on the remote control, of a button or a set of buttons, possibly cooperating with a screen-type user interface. With these means, he can call up a scenario stored in memory and control its execution.

An exemplary scenario is a scenario associated with a departure of the user. According to this scenario, when a user leaves his home, he wants all the electrical appliances in his home to be switched off, and even his doors to be locked.

DESCRIPTION OF THE PRIOR ART

U.S. Pat. No. 6,297,746, the content of which is incorporated by reference, discloses a home automation system controlled using a control panel that has a button called "all off". Simply pressing this button switches off all the appliances that are not needed. Similarly, a specific button dedicated to a departure of the user can be provided. This control panel can be portable. It is relatively complicated inasmuch as it can be used to control a very varied set of appliances. Because, for certain procedures, it communicates with a large number of appliances, it needs to have significant power supply and information processing resources. Finally, because of its portable nature, there can be no certainty, at the moment when it is operated to control a large number of appliances, of being within range of all these appliances.

US patent application 2004/0203387 also discloses a home automation system comprising a remote control, a relay and electrical appliances. The electrical appliances are controlled by the remote control via the relay. The control commands are defined on the remote control and simply reformulated on the relay. Thus, the remote control does not generate any command to run a scenario, but rather a series of controls that are sent to the relay then dispatched to the appliances concerned from the latter. Furthermore, in this document, the remote control cannot a priori directly control the appliances.

SUMMARY OF THE INVENTION

The aim of the invention is to provide a communication method that remedies the abovementioned drawbacks and improves the methods known from the prior art. In particular, the invention proposes a simple method with which it is possible to simplify the control of a scenario in the field of the remote control of the opening and closing of openings in a building, while offering a wide range of possibilities.

The operating method according to the invention is such that control commands are sent selectively according to a scenario to the home automation appliances over the same communication media by the relay when the latter receives a specific command sent by the portable remote control to the relay.

Various ways of executing the operating method are defined by the dependent claims 2 to 8.

The home automation installation according to the invention comprises a portable remote control, a relay and home automation appliances. At least some home automation appliances can receive, by wireless channel, control commands sent by the portable remote control. It comprises hardware means and software means for implementing the operating method.

The relay can comprise means for translating a specific control command for executing the scenario into different control commands for the attention of the home automation appliances.

DESCRIPTION OF THE DRAWINGS

The appended drawing represents, by way of examples, an embodiment of a home automation installation according to the invention and a way of executing a method of operating this installation.

DESCRIPTION OF THE PREFERRED EMBODIMENTS

Figure 1:
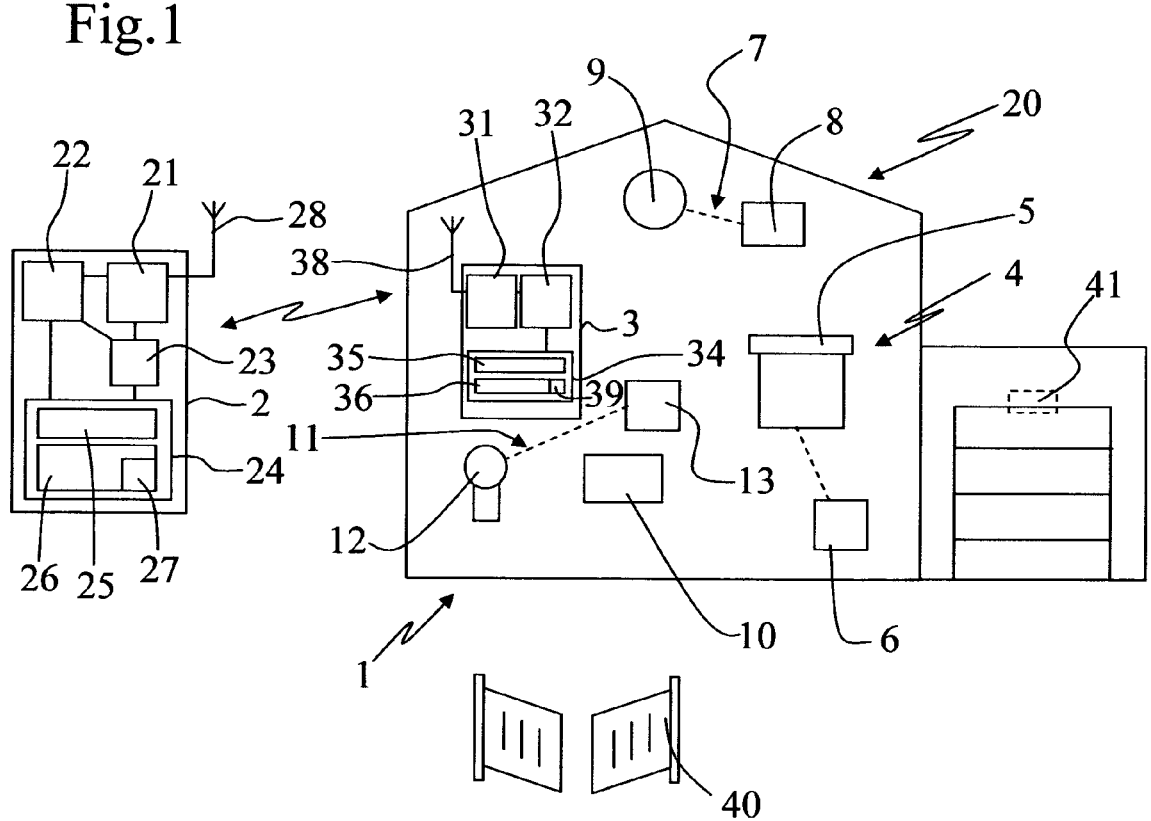
FIG. 1 is a diagram of an embodiment of the home automation installation according to the invention.

The home automation installation 1, represented in FIG. 1, mainly comprises a portable remote control 2, a relay 3 and a set of home automation appliances 4, 7, 10 and 11 equipping a building 20.

The portable remote control 2 comprises a transmitter-receiver 21 of control commands in the form of electromagnetic waves and an associated antenna 28. It is powered by an internal electrical power source 23 (for example a battery). It also comprises a user interface 24 provided with a set 26 of control buttons on which actions trigger direct transmissions of individual control commands to various appliances. A microcontroller 22 is connected to the transmitter-receiver 21 and to the user interface 24. For example, it can be an access remote control used to control the opening and closing of a gate, the opening and closing of a garage door, the switching on and off of an outside light and the locking and unlocking of an entry door lock.

The remote control is preferably small, so that it can easily be carried, in particular with a bunch of keys.

The portable remote control also comprises a means 25 of informing the user, making it possible to transcribe in a way that is visible to the user the correct execution of a control command, in particular when the appliance being controlled is not visible to the user from the place where he is located. Two different colored light-emitting diodes (for example green and orange) or one two-color light-emitting diode can be used for this purpose.

The remote control also comprises at least one button 27 with which to control the execution of a scenario. This button is called "house button". The remote control can have other buttons with which to control the execution of scenarios.

To communicate with the various above mentioned electrical appliances in the house, the remote control is first paired with these appliances, that is, an identifier is exchanged to enable a communication link to be created between the remote control and the appliances and recognize where the transmitted information is being sent to and originates from, whether the information is control commands or any other type of message.

Moreover, the remote control is paired with the relay 3 preferably located inside the building. This relay has a transmitter-receiver 31 of control commands in the form of electromagnetic waves and an associated antenna 38. It also comprises a user interface 34 provided with a set 36 of configuration buttons and a means 35 of informing the user, such as a screen. A microcontroller 32 is linked to the transmitter-receiver 31 and to the user interface 34.

The relay is itself paired with a certain number of appliances, which may be different or common to those with which the remote control is paired. It is assumed that the relay is paired with a motorized lock device 11 comprising a lock and a sensor 13, a motorized roller blind device 4 comprising a roller blind 5 and a sensor 6, an alarm system 10, a lighting device 7 comprising a lamp 9 and a sensor 8, a motorized gate device 40 and a motorized garage door device 41.

In the case described, the remote control is, for example, paired with the motorized gate, the motorized garage door and the alarm.

The relay is positioned in a housing and can communicate wirelessly with the appliances with which it is paired.

Presses on the control buttons of the remote control directly control the appliances that are paired with the remote control.

A press on the home button causes a specific control command to be transmitted by the remote control for the attention of the relay. The relay interprets this specific control command as an command to run a scenario and translates it into control commands that it sends for the attention of various appliances to fulfill the scenario functions expected by the user.

According to a first method of operating the home automation installation, the specific control command is a general command to close motorized appliances and/or a command to switch off other electrical appliances. The relay receives the control command then simply repeats it to the various appliances with which it is paired and that are involved in the scenario. Inasmuch as the appliances paired with the relay can be different from those paired with the remote control, it is possible to create a scenario including the movement or the reaction of various appliances that are not directly controlled by the remote control. Thus, when the user leaves, when he presses the house button, the roller blinds are closed, the lights are switched off, the garage door and the gate are closed. Given that only the relay knows the appliances involved in the scenario, this scenario is defined on the relay.

Figure 2:
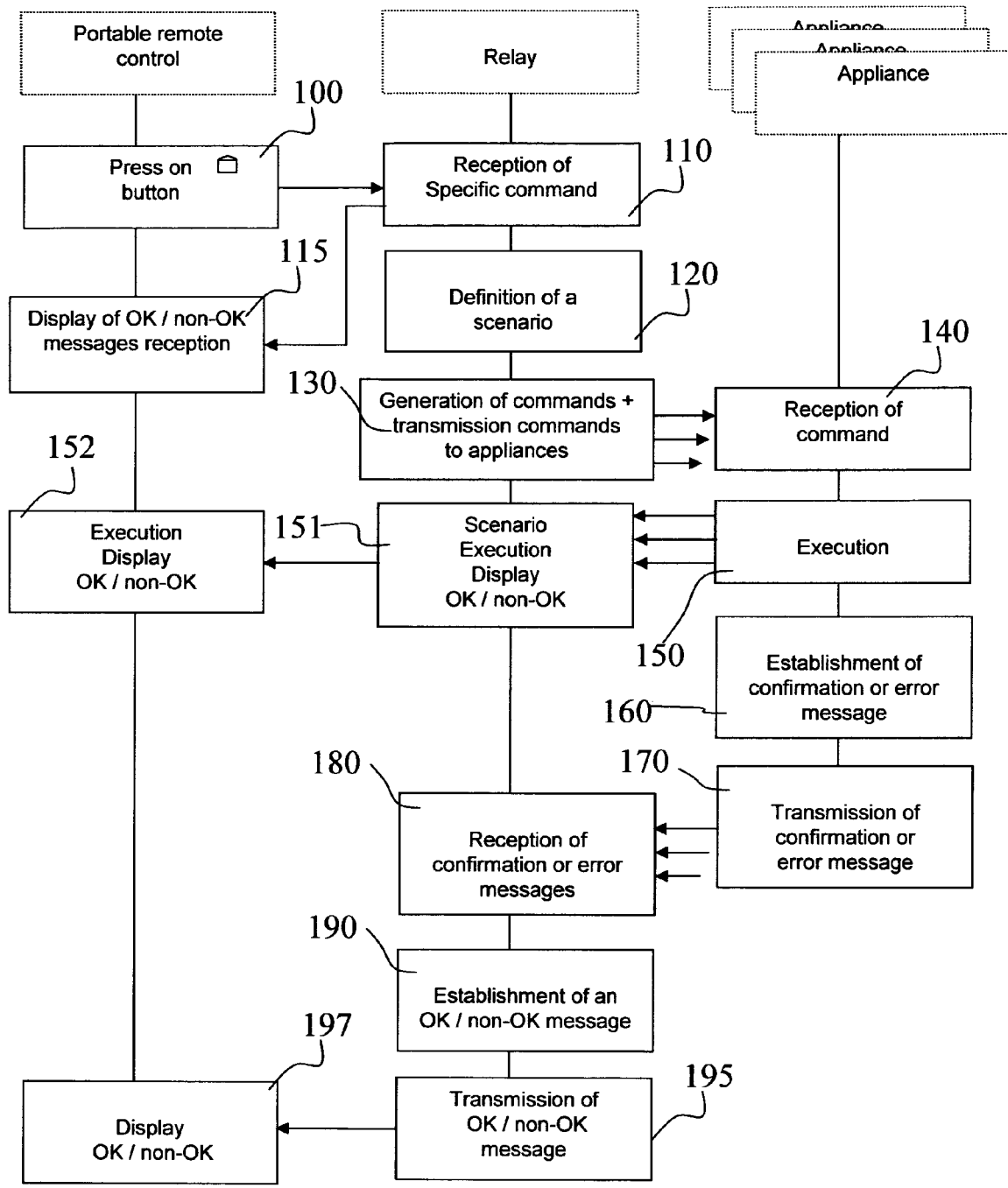
FIG. 2 is a flow diagram of a way of executing the method of operating the installation.

According to a second method of operating the home automation installation, the microcontroller 32 of the relay can be used to generate control commands addressed to the various appliances in response to the specific control command that the relay has received. The specific control command from the portable remote control is always addressed directly to the relay with which it is paired. The various steps in the communication are described below with reference to FIG. 2.

In a first step 100, the user presses the house button on the remote control. The latter then uses its electromagnetic wave transmitter to send a specific control command.

In a step 110, the relay receives this command. It can, if necessary, then transmit an acknowledgement message which is received by the portable remote control and reported to the user in a step 115. The remote control can display an error message if it does not receive an acknowledgement message within a predefined time. Once the specific control command is received by the relay, the latter then switches to a step 120 for defining a scenario. This scenario can be dependent on a set of parameters predefined on the relay, for example when it was configured. Detailed examples of scenario definitions will be described below.

The definition of the scenario leads, in a step 130, to the generation and transmission of a certain number of control commands to various appliances with which it is paired and that are involved in the scenario. These commands can be specific to each appliance or to groups of appliances.

In a step 140, a control command from the relay is received by the various home automation appliances. This command is, if possible, executed in a step 150. If the appliances have a two-way command transmitter-receiver, they can transmit a message reporting that the control commands are being executed and this message can be retransmitted from the relay to the portable remote control. In steps 151 and 152, the information is reported to the user by the various means provided on the relay and on the remote control.

If the appliances have a two-way command transmitter-receiver, they can also, if necessary, generate, in a step 160, and transmit, in a step 170, an information message to confirm:

that the command has been correctly received, that the command has been correctly executed, or, on the contrary, that an event has prevented this command from being executed.

In a step 180, the relay receives the information messages from the appliances involved in the scenario. In a step 190, it creates an information message for the attention of the remote control, this message generally repeating all the information messages transmitted by the appliances. This message can, basically, be a positive message when all the appliances involved in the scenario have confirmed that the order they had received has indeed been executed, and a negative message when at least one of the appliances has reported an error in the execution of the command.

In a step 195, this simplified information message is transmitted by the relay to the remote control. In a step 197, this information message reports to the user the successful or unsuccessful execution of the scenario through the information means. A successful execution can be reflected by the illumination of the green LED and an unsuccessful execution can be reflected by the illumination of the orange LED. Any other known means or combination of means of displaying information can also be used.

Alternatively, the information message transmitted by the relay for the attention of the remote control can be more sophisticated. Thus, for example, the information message can contain information on the successful or unsuccessful receipt and also on the successful or unsuccessful execution of the commands of the scenario. Error causes can also be reported.

Preferably, the relay also comprises display means, more sophisticated than those of the remote control. These means can advantageously be used by the user in the case where a scenario has not been executed in order to understand the source of the problem. The display means can be used only at the request of the user. These display means can also be used to configure the relay.

Figure 3:
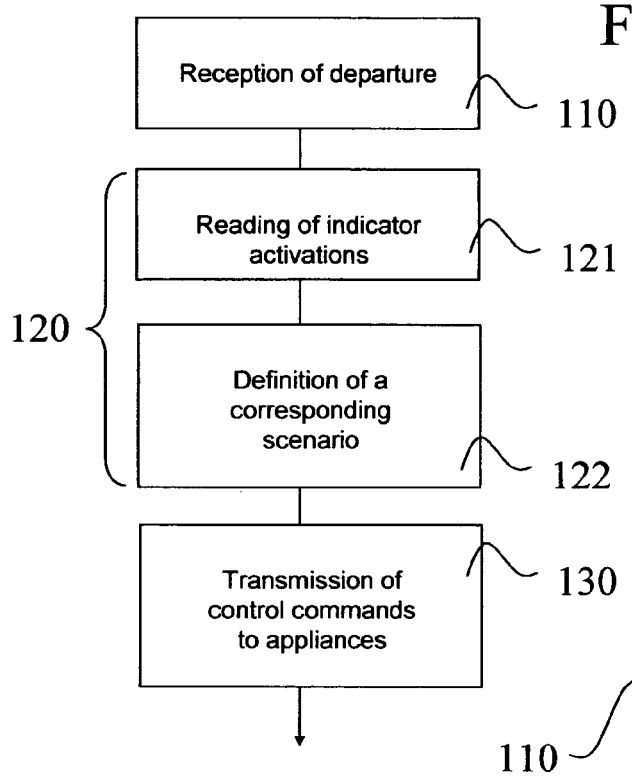
FIGS. 3 to 5 are variants of the way of executing the method of operating the installation.

A first variant of definition of a scenario on the relay is described below with reference to FIG. 3.

In this first variant, it is assumed that the relay comprises a user interface with buttons or contacts, on which the user can act to select certain states. For example, the relay housing has a scenario selector 39 that can be used to select a particular scenario, such as, for example:

a "complete closure" scenario, a "partial closure with alarm" scenario, an "alarm only" scenario.

To simplify the use of the installation, a departure scenario is stored in memory by default in the relay.

Normally, the user chooses the "partial closure with alarm" scenario. A press on the house button of the remote control then provokes a closure of the entrances (doors, garage door), while the shutters remain open. The alarm is activated and the whole can operate as described in document EP 1 405 280.

However, the user can, before leaving on vacation, choose to activate the "complete closure" scenario. At the time of departure, a single press on the same house button of the remote control then initiates a general closure of the entrances, of the roller blinds and the activation of the alarm system of the building.

Alternatively, the user can also choose to select the "alarm only" scenario so that only the alarm outside the building is operating, for example if he remains in his home.

In this first variant, after the step 110 for receiving the control command already described previously, in a step 121 the relay reads the state of its scenario selector. In a step 122, it determines the scenario that needs to be controlled. Once this scenario has been determined, in a step 130 already described above, the relay generates and transmits the control commands necessary to implement it.

Figure 4:
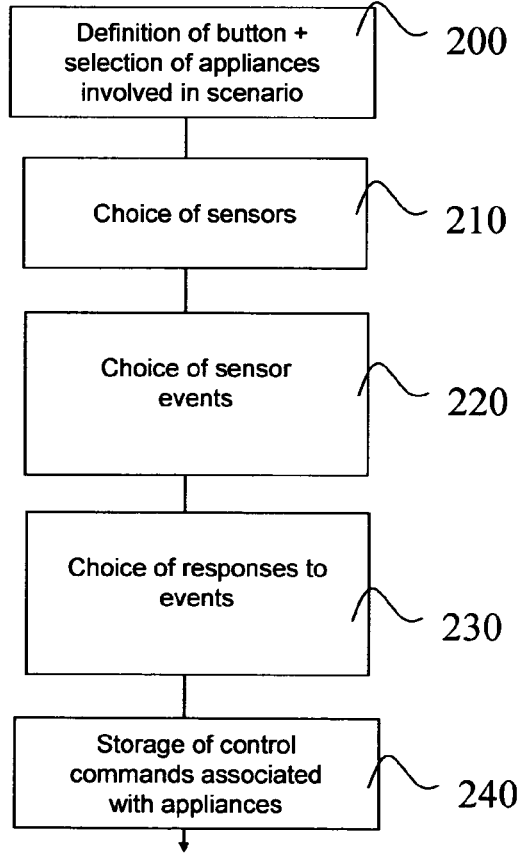
Figure 5:
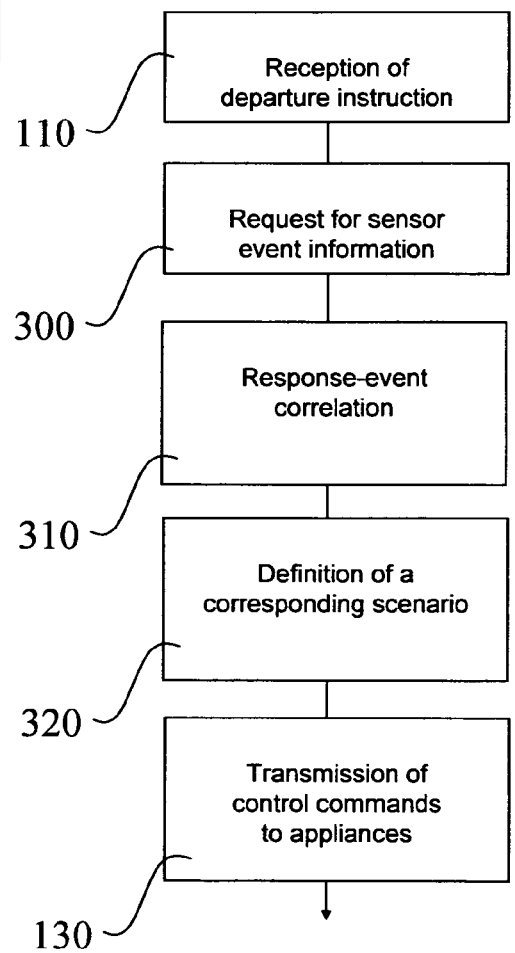

A second variant of definition of a scenario on the relay is described below with reference to FIGS. 4 and 5.

The relay is, for example, configured as described below. In a step 200, the context of a scenario is defined. In this step, there is defined in particular an association between the house button of the remote control and the scenario defined in the relay and the home automation appliances involved in the scenario are selected. In addition to this selection of the appliances, which is done in a known manner or quite simply combines all the appliances paired with the relay, the user can associate one or more sensors or automatic functions, internal to the relay or, if appropriate, used in the building for example by home automation appliances.

In a step 210, to consider the installation of FIG. 1, the user can, for example, select the sensor 6 associated with the roller blind or the sensor 8 associated with the lighting device 7. The sensor 6 can, for example, be an automatic function incorporating a clock, to drive the roller blind according to the time of day. The sensor 8 combines, for example, a presence sensor and a brightness sensor. In this configuration, functional links are established between these sensors and the relay, such that the latter can also receive the data measured by these sensors.

In a step 220, the user chooses events that will be used to define the scenario and that can be detected by the selected sensors, for example a particular schedule, a brightness threshold.

In a step 230, the user associates responses with these events, that is, one or more actions to be executed by one or more appliances.

In a step 240, the control commands to be associated with the home automation appliances are stored.

Once the relay is configured, it can operate.

This operation is described with reference to FIG. 5.

After the step 110 of reception of the control command already described previously, the relay sends, in a step 300, to the various selected sensors, an interrogation message to determine the routine events that can have an influence on the scenario. For example, before a predetermined time, a departure scenario simply causes the entrances to be locked and the alarm to be activated, whereas after this time, the departure scenario causes not only the entrances to be locked and the alarm to be activated, but also the roller blinds to be closed.

In a step 310, once the events are known to the relay, the latter searches in its memory for correlations between these events and the responses that have previously been defined.

In a step 320, the relay defines the scenario, that is, determines the control commands to be sent to the various appliances involved in the scenario.

Once this scenario is determined, in a step 130 already described above, the relay sends the control commands necessary to its implementation.

Thus, following one and the same press on the house button of the remote control, a multitude of scenarios can be implemented, without any other intervention on the part of the user being necessary (other than the installation configuration steps).

Advantageously, the two variants of definition of a scenario described with reference to FIGS. 3 and 5 can be combined. In practice, the relay can define a scenario according on the one hand to data supplied by sensors and on the other hand to the state of a scenario selector provided on the relay.

Other variants, associated with the use of a relay on which are defined the commands to be transmitted to appliances, following the reception of a specific control command originating from the portable remote control, are of course possible.

The use of a relay in the installation described makes it possible to save on portable remote control resources (in terms of power supply and data processing). This is because a single command is sent from the remote control, and not a plurality of commands to the various appliances.

As for the relay, it can be connected by wire to an electrical power source and manage the transmission of the various commands with a greater power and therefore greater range. Thus, there is also eliminated the risk that an appliance located at the range limit will not receive the command sent by the portable remote control.

As seen above, the relay can comprise functions for receiving information messages, confirming to it that the command has indeed been received and/or executed by each appliance. Then, the relay can relay this information to the remote control. The user interface of the portable remote control can therefore be simplified, in favor of that of the relay, to which the user can go to ascertain the nature of an error that has occurred.

The use of a relay also makes it possible to manage more comprehensively all the appliances in the building. In practice, the relay does not simply retransmit a scenario control command from the remote control, but generates and transmits particular commands suited to the various appliances. It makes it possible to manage the control of a very varied set of home automation appliances.

At the time of departure of the user, for example, it is desirable not simply to have a scenario in which all the appliances are switched off. In practice, a user may choose to leave an outside light on, possibly for a predetermined time, to leave all or some of the shutters half-open, to activate the alarm or not, depending on whether people are or are not still present in the building and to trigger or not trigger presence simulation means.

The various departure scenarios are therefore programmed on the relay. The fact that the relay cooperates with a certain number of sensors simplifies the programming. In practice, there is no need to program a number of fixed scenarios, but only a set of responses to events, the occurrence of which is supplied by the sensors. The scenario is therefore constructed according to these responses. These aspects could be implemented on the portable remote control only at the price of integrating all the sensors in that same remote control, whereas the relay housing can use sensors and automatic functions used by other appliances.

To ensure the safety of the installation, the relay can make it possible to retransmit commands to stop the motorized home automation devices.

In the particular case where a single scenario is defined in the relay (for example, in the case where there is no scenario other than a user departure scenario), the simple fact that the relay receives a message from the portable remote control is interpreted as a specific control command to execute the scenario independently of the content of the message received.

A scenario can also be implemented directly by the user acting on the relay.

Advantageously, the method of operating according to the invention comprises a step for returning information from the home automation appliances to the relay to report the successful or unsuccessful reception and/or execution of the control commands.

Preferably, the method of operating according to the invention also comprises a step for returning information from the relay to the portable remote control to report the successful or unsuccessful execution of the scenario.

The invention claimed is:

1. A method of operating a home automation installation (1) comprising a portable remote control (2), a relay (3) and home automation appliances (4, 7, 10, 11, 40, 41), the method comprising the following steps:

using the remote control to select control of one of an appliance or the relay;

sending over a media, by wireless channel, control commands being, as selected from the portable remote control, one of a direct command to the home automation appliance or a specific commands to the relay;

receiving a control command from the portable remote control by one of the home automation appliance or the relay as selected;

performing one of an execution of the control command by the appliance or a generation of selective control commands in the relay, and sending selective control commands, over the media by the relay in response to the control command being a specific command, to the home automation appliances according to a scenario, wherein the remote control is configured to send direct control signals and specific relay command signals.

2. The operating method as claimed in claim 1, which comprises a preliminary step for pairing the relay with the home automation appliances and pairing the relay with the portable remote control.

3. The operating method as claimed in claim 1, which comprises, on the relay, a preliminary step for defining the scenario determining the control commands to be sent to the home automation appliances involved in the scenario.

4. The operating method as claimed in claim 3, wherein the step for defining the scenario comprises a substep for reading on the relay a state of a selector (39) and/or a substep for determining data measured by sensors (6, 8, 13).

5. The operating method as claimed in claim 4, which comprises a step for correlating data measured by sensors with actions of the home automation appliances, this step being preliminary to that of defining the scenario.

6. The operating method as claimed in claim 1, wherein the scenario is defined on the relay.

7. The operating method as claimed in claim 1, wherein the control commands sent selectively to the home automation appliances are generated on the relay.

8. The operating method as claimed in claim 1, wherein a scenario, pre-saved in the relay, brings about, when it is executed, the closure of the entrances to a building and the switching off of the lighting.

9. A home automation installation (1) comprising a portable remote control (2), a relay (3) and home automation appliances (4, 7, 10, 11, 40, 41), and wherein at least some home automation appliances can receive directly, over a media, by wireless channel, control commands sent by the portable remote control, which comprises hardware means (21, 22, 24, 31, 32, 34) and software means for implementing the operating method of claim 1.

10. The home automation installation as claimed in claim 9, wherein the relay comprises means (32, 34) for translating a specific control command for executing the scenario into different control commands for the attention of the home automation appliances.

11. The operating method as claimed in claim 1 further comprising sending an acknowledgement message from the relay to the portable remote control upon receiving specific commands from the portable remote control by the relay.

* * * * *